United States Patent
Al-Dhafeeri et al.

(10) Patent No.: US 7,500,520 B2
(45) Date of Patent: Mar. 10, 2009

(54) METHOD OF CEMENTING WELL BORES

(75) Inventors: Abdullah M. Al-Dhafeeri, Dhahran (SA); Abdullah S. Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 2 days.

(21) Appl. No.: 11/591,043

(22) Filed: Oct. 31, 2006

(65) Prior Publication Data

US 2008/0099202 A1    May 1, 2008

(51) Int. Cl.
*E21B 33/138* (2006.01)
(52) U.S. Cl. ...................... 166/293; 166/300
(58) Field of Classification Search ........................ None
See application file for complete search history.

(56) References Cited

U.S. PATENT DOCUMENTS 4,083,407 A * 4/1978 Griffin et al. ................. 166/291
4,257,483 A   3/1981 Morris et al.

OTHER PUBLICATIONS

U.S. Appl. No. 06/169,454-A1, filed Aug. 3, 2006, Savery et al.

* cited by examiner

*Primary Examiner*—Zakiya W. Bates
(74) *Attorney, Agent, or Firm*—Abelman, Frayne & Schwab

(57) ABSTRACT

A method of cementing an oil well with a silicate-forming gel solution and an acid-soluble cement separated by a polymeric spacer which permits solubilization and removal of the cement by HCl in the event of a fracture in subterranean formation and the need for water and/or gas shutoff.

9 Claims, No Drawings

METHOD OF CEMENTING WELL BORES

BACKGROUND OF THE INVENTION

1. Field of the Invention

The present invention relates to a method for the cementing of well bores and, more particularly, obtaining improved handling with respect to water and/or gas shut-off of cemented well bores.

2. Description of the Prior Art

In the drilling and completion of an oil well, subterranean zones penetrated by well bores are commonly sealed by hydraulic cement compositions. For example, hydraulic cement compositions, which are also known as Portland cement compositions, and which are not soluble in acid, are used in primary cementing operations whereby strings of pipe, such as casings and linings, are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened, substantially impermeable cement therein, which supports and positions the pipe string in the well bore, and seals the exterior surfaces of the pipe string to the walls of the well bore. Hydraulic cement compositions are also utilized in a variety of cementing operations, such as sealing highly permeable zones or fractures in subterranean zones, plugging cracks or holes in pipe strings and the like.

Notwithstanding the petroleum industry's use of acid-insoluble cement in their primary cementing operations, there are instances, such as in subterranean fracturing operations used to repressurize a formation, or in the drilling of well bores in the presence of excessive water and/or gas production, where the use of an acid insoluble cement in the well bore results in major economic, operational, and environmental problems. Well-bores cemented with hydraulic cements which are acid-insoluble cannot be opened by an acidic wash. Other problems which affect production operations are oil reduction, low-flowing well head pressure, and the necessity to expand the capacity of the water separation and water handling facilities to dispose of large volumes of waste water. Unwanted water production from oil wells can also cause secondary problems, such as sand production, corrosion, emulsion formation and scale formation.

SUMMARY OF THE INVENTION

It has now been found that significant advantages are to be realized when cementing the well bores of wells to anticipate the possibility of a fracture occurring in a formation and the need to shutoff water and/or gas flow, to employ a combination of an acid-soluble cement and a gel-forming silicate solution as the primary cementing material. The combination of a gel-forming silicate-solution with an acid-soluble cement has been shown to provide improved performance in water and/or gas shutoff treatment of production wells and in fractured formations.

Among the benefits to be realized by using an acid soluble cement is that if it enters or invades the production zone of the well bore and causes damage thereto, it can be readily removed by injecting hydrochloric acid into the production zone.

DETAILED DESCRIPTION OF THE INVENTION

The present invention is directed to a method for the cementing of the well bores of oil wells to enable the ready removal of the cementing material should the need arise at a later date due to a fracture in the formation with the attendant need to shut-off gas and/or water flow.

By using a mixture of an acid-soluble cement with a silicate-forming gel, a thick and strong cement is achieved. As a matter of convenience, any ratio of acid-soluble cement to silicate gel can be employed. However, one part acid-soluble cement to one part water-soluble silicate has been found to yield satisfactory results.

The silicates which can be used in accordance with the present invention are those which are water-soluble and which form polymeric silicate chains or a three-dimensional network of silica polymers. These silicates are alkali-metal silicates, preferably sodium and potassium silicates, and mixtures thereof. These silicates are commercially available as dry powders, or concentrated aqueous solutions containing 50 parts of solid per 100 parts of solution, and having a pH of 10 or greater.

In a preferred embodiment of the method of the present invention, when drilling mud, for example, is being lost from the well-bore due to a fracture, or when high permeability zones intersect with the well-bore, the following sequence of steps is employed:

1) injection of a gel-forming silicate solution for a considerable depth to achieve penetration into the fracture and also into the surrounding matrix rock of the reservoir;

2) displacement with a small volume of a spacer, for example, from about 0.01% to about 15%, by weight, of a polymer, for example, a guar type polymer in fresh water, to delay contact between the silicate and the cement to be injected; and 3) injection of an acid soluble cement to penetrate the fracture.

When the sodium silicate and the acid soluble cement come into contact at a temperature of from about 75° C. to about 195° C. and a pressure of about 14.7 psig to about 10,000 psig, a silicate gel/cement is formed in situ.

In the event the acid-soluble cement should invade the hydrocarbon zone causing formation damage, the injection of a 15% HCl solution, for example, will dissolve the acid-soluble cement from the hydrocarbon production zone. Also, should there be a possible cross-flow between a subterranean fracture and the rock matrix creating a communication between the water and oil zones during the injection of the acid-soluble cement into the water zone, the cement could readily be removed by HCl having a 15% concentration or even by a lesser concentration, say, 8%.

EXAMPLE

A soluble cement was prepared by adding sufficient water to a dry, acid-soluble cement (Magne Plus® cement, BJ Atlas Service Co.) and mixing for a period of time sufficient to produce a homogenous fluid. A FAN-35 model viscometer was then used to measure the viscosity of the 100% soluble cement at temperatures of 75° F., 100° F. and 195° F. and at speeds of 3 rpm, 6 rpm, 100 rpm, 200 rpm, 300 rpm, and 600 rpm.

A 100% sodium silicate solution was prepared by adding water to sodium silicate. The viscosity of this solution was also measured at 75° F., 100° F., and 195° F. and at the speeds indicated previously with a FAN-35 model viscometer.

A mixture was then prepared by adding 50% by volume of the soluble cement fluid, as prepared above, to 50% by volume of the sodium silicate fluid, as prepared above, and then the two were mixed together.

The sodium silicate/soluble cement mixture was then transferred to FAN-35 model viscometer, and its viscosity was measured at 75° F., 100° F., and 195° F. and at 3, 6, 100, 200, 300 and 600 rpm.

The results obtained are set forth below in Table 1.

TABLE 1

| Temperatures °F. | Solution Type | 600 rpm | 300 rpm | 200 rpm | 100 rpm | 6 rpm | 3 rpm |
|---|---|---|---|---|---|---|---|
| 75 | 100% Sodium Silicate | 7 | 5 | 4 | 2 | 1 | 1 |
| 100 | 100% Sodium Silicate | 7 | 3 | 2 | 2 | 1 | 1 |
| 195 | 100% Sodium Silicate | 4 | 3 | 2 | 1 | 1 | 1 |
| 75 | 100% Sodium Silicate | 80 | 65 | 53 | 40 | 27 | 21 |
| 100 | 100% Sodium Silicate | 62 | 49 | 42 | 33 | 21 | 18 |
| 195 | 100% Sodium Silicate | 60 | 40 | 34 | 26 | 10 | 8 |
| 75 | 50% Sodium Silicate + 50% Soluble cement | 110 | 86 | 74 | 67 | 49 | 48 |
| 100 | 50% Sodium Silicate + 50% Soluble cement | gelled | gelled | gelled | gelled | gelled | gelled |
| 195 | 50% Sodium Silicate + 50% Soluble cement | gelled | gelled | gelled | gelled | gelled | gelled |

Rpm: revolutions per minute
Remarks: gelled means the solution had formed a gel and there was no reading recorded by the viscometer.

As the dial readings of the viscometer increase, higher viscosities are indicated. From an examination of Table 1, it can be seen that the highest readings were recorded with a mixture of 50% sodium silicate+50% soluble cement. Then as the temperature of the mixture increased, the viscosity increased and formed a gel. The increase in viscosity and gelling trend indicate that a thick solution has formed that can provide improved performance in the water and/or gas shutoff treatment of production wells and in fractured formations.

It is to be understood that the present invention is not limited to the specific applications and embodiments illustrated and described herein, but embraces such modified forms thereof as come within the scope of the appended claims.

What is claimed is:

1. A method of cementing a fracture to shutoff water or/or gas flow in a subterranean zone penetrated by a well bore, which comprises the following steps in sequence:
    a. preparing and injecting a water-soluble silicate solution in the fracture;
    b. adding a water-soluble polymeric spacer; and
    c. injecting an acid-soluble cement whereby a silicate gel/cement combination forms to shut-off the water and/or gas flow from the fracture.
2. The method of claim 1, wherein the silicate gels are selected from the group consisting of sodium silicate, potassium silicate, and mixtures thereof.
3. The method of claim 1, wherein the polymeric spacer is a guar-type polymer.
4. The method of claim 1, wherein the polymeric spacer is present at a concentration of about 0.01% to about 15%, by weight, of water.
5. The method of claim 1, wherein the water-soluble silicate is sodium silicate.
6. The method of claim 5, wherein the percentage ratio, by volume, of sodium silicate to water is from about 20% to about 100%.
7. The method of claim 6, wherein the percentage ratio, by volume, of sodium silicate to water is about 50%.
8. The method of claim 1, wherein the temperature is from about 100° C. to about 195° C.
9. The method of claim 1, wherein the pressure is from about 14.7 psig to about 10,000 psig.

* * * * *